No. 613,972. Patented Nov. 8, 1898.
H. CONSTABLE.
RIM AND RESILIENT TIRE FOR WHEELS.
(Application filed Dec. 29, 1897.)

(No Model.)

UNITED STATES PATENT OFFICE.

HENRY CONSTABLE, OF LONDON, ENGLAND.

RIM AND RESILIENT TIRE FOR WHEELS.

SPECIFICATION forming part of Letters Patent No. 613,972, dated November 8, 1898.

Application filed December 29, 1897. Serial No. 664,229. (No model.)

*To all whom it may concern:*

Be it known that I, HENRY CONSTABLE, gentleman, a subject of the Queen of Great Britain, residing at 267 Ladbroke Grove, London, England, have invented certain new and useful Improvements in Rims and Resilient Tires for Wheels, of which the following is a specification, reference being had to the accompanying drawings.

My invention relates to improvements in rims and resilient tires for wheels.

An essential feature of my invention consists in providing inside the rim of the wheel a flexible resilient membrane that serves as a rest or support for the tire proper, and which membrane is stretched or supported between the sides of the wheel-rim. The tire proper may consist of an endless band of any suitable shape in cross-section and formed of any suitable material. Said tire is placed between the edges or sides of the wheel-rim, and when it is in position its outer surface or periphery projects beyond the said edges, so that the wheel is supported on the ground through the tire proper and its resilient bed or support. The said tire is retained in place by the edges or sides of the wheel-rim in such a manner that it can yield or move radially to a slight extent; or it may be retained by an outer covering, preferably in the form of a band, secured along each of its edges to the rim and constituting the tread of the tire.

In order that my invention may be clearly understood and readily carried into effect, I will describe the same more fully, with reference to the accompanying drawings, in which—

Figure 1:
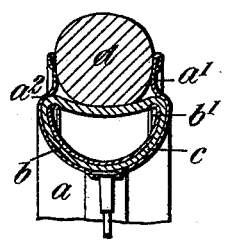
Figure 2:
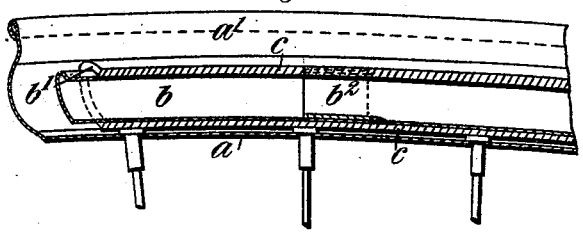
Figure 3:
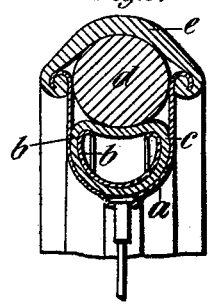
Figure 4:
Figure 5:

Figures 1 and 2 are respectively a cross-section and a longitudinal section of a rim and tire constructed according to my invention. In Fig. 2 the tire proper is not shown in order to illustrate more clearly the construction of the rim and bed or support. Fig. 3 is a view similar to Fig. 1, showing another form of my improved rim and tire. Figs. 4 and 5 are detail views hereinafter referred to.

Referring to Figs. 1 and 2, I construct the wheel-rim $a$ with the edges or outer portions of its side $a'$ arranged in the form of parallel flat rings or cheeks, that are pressed inward, so as to be slightly nearer to each other than are the sides of the body or trough portion of the rim. Internal shoulders $a^2$ are thus formed between the cheeks $a'$ and the trough portion of the rim. This trough portion is made somewhat deep to adapt it to receive an inner or supplementary trough-shaped rim $b$, formed of metal, hard rubber, vulcanite, celluloid, or the like, which has its edges $b'$ curled or bent over inwardly and adapted, when said rim is in position, to rest under the shoulders $a^2$ of the wheel-rim. Said inner rim is cut or divided to enable it to be sprung into place over the edges of the wheel-rim.

The inner rim is inclosed within a tube or tubes of india-rubber $c$, and the portion of the said tube that is stretched between its edges $b'$ forms the resilient membrane or bed upon which the tire proper, $d$, may rest. The relative sizes of the two rims are such that when the inner rim is forced into position in the wheel-rim the rubber tube is firmly held between the two rims. A suitable fastening or fastenings may be employed to secure the ends of the inner rim together, and, if desired, the ends of the rubber tube or tubes may also be fastened together when in place. I may, however, so form the inner rim that its elasticity or "set" will give it sufficient hold or grip upon the wheel-rim to retain it in place; or I may secure said inner rim to the wheel-rim by bolts or other suitable devices.

I prefer to first form the inner rim of somewhat larger diameter than the wheel-rim, and after such inner rim is cut or divided I contract or reduce the width and depth thereof for a short distance at one of the ends, as shown at $b^2$ in Fig. 2, so that said end will fit into or be overlapped by the other end. By this construction I avoid any gap between the ends of said rim when it is extended in order to be sprung into place, as if such a gap were formed the rubber tube might be caught therein and so be cut or torn.

When placing the inner rim in position, the sides thereof are temporarily pressed toward each other to permit it to be pushed between the cheeks $a'$ of the wheel-rim. The inner rim is so constructed that the edges thereof have a tendency to expand or separate, so that as soon as said rim is pushed beyond the shoulders $a^2$ the said edges spring under said shoulders and press against the side of the trough portion of the wheel-rim, whereby not only is the inner rim retained securely in place, but the resilient bed is also clamped or held between the edges of the inner rim and the adjacent portions of the wheel-rim.

In order to obtain a more perfect lateral resiliency of the inner rim, I sometimes construct the same with corrugations $b^3$, running in a longitudinal or circumferential direction. In Fig. 4 I have shown a cross-section of such an inner rim.

The inner rim may be removed from the wheel-rim when desired by means of a suitably-bent lever or a pair of such levers pivoted together after the manner of a pair of scissors.

Instead of employing an india-rubber tube to form the resilient membrane, I may employ a strip of india-rubber wound helically around the inner rim, as shown in Fig. 5; or I may employ a strip or band of india-rubber that is spliced or otherwise secured at its edges to a strip or band of any suitable fabric, thus forming a tube of which only that portion adapted to rest across the edges of the inner rim consists of india-rubber; or I may solution the edges of a rubber strip such as I have just described directly to the sides of the inner rim. I prefer to line those portions of the rubber tube or strip that bear upon the edges or sides of the inner rim with a suitable protective fabric. In the case of a helically-wound strip I may stitch or otherwise secure the adjacent edges thereof to each other at intervals or along the entire length. I do not, however, confine myself to the use of india-rubber to form the resilient membrane or bed, as it is obvious that I may employ any appropriate resilient material therefor.

$d$ is the tire proper, which may be formed of india-rubber, felt, cork or the like or of a coil of wire or of any other material or combination of materials having a suitable amount of flexibility or resiliency. It may be of circular or other shape in cross-section; but I prefer to employ a tire of the shape shown in Fig. 1. Such a tire is capable of being turned so as to present any one of its sides as the wearing-surface, so that when one side becomes worn or cut the tire may be removed from the wheel-rim, turned, and replaced with a different side outward. The said tire is guided or retained in its central position by the cheeks $a'$ of the wheel-rim, but is capable of radial movement to the extent permitted by its own elasticity and that of the resilient bed $c$. The tire illustrated in Fig. 1 is retained upon the wheel-rim by being so constructed as to be not readily extensible to a sufficient extent to allow it to slip over the sides or edges of said wheel-rim. In some cases, however, I may employ a cover for retaining the tire in position, as shown in Fig. 3, where $e$ is a cover constituting the tread of the tire, and formed of leather, vulcanized rubber, or other suitable material. Said cover is secured to the edges or sides of the wheel-rim in any convenient manner.

I sometimes dispense with the shoulders $a^2$ in the wheel-rim, and in such cases I prefer to so form the inner periphery of the tire that it only rests upon the resilient bed at or about the center thereof, as shown in Fig. 3, so as to obtain the full advantage of the resiliency of said bed.

My invention provides a tire possessing a high degree of resiliency and wherein the means for affording this resiliency are not liable to wear or injury and are separate from and independent of the body or wearing portion of the tire, which may therefore be constructed of any cheap or hard wearing material without detriment to the resiliency. My tire is, moreover, capable of being constructed in various degrees of strength and weight to suit all kinds of vehicles.

What I claim is—

1. In a resilient tire for wheels, the combination with the wheel-rim, of a detachable inner rim on which is mounted a resilient bed or support for the body of the tire proper, substantially as described.

2. In a resilient tire for wheels, the combination of a wheel-rim having flat parallel outer sides or edges, a detachable inner rim having laterally-expansible edges, a tube of resilient material inclosing said inner rim and being gripped between the same and the wheel-rim, and an endless band or tire resting on said resilient material, substantially as and for the purposes specified.

3. In a resilient tire for wheels, the combination of a wheel-rim having inwardly-pressed flat parallel outer sides or edges forming guide-surfaces and internal shoulders, a detachable inner rim having laterally-expansible edges tending to house themselves under said shoulders, an adjustable tube of resilient material inclosing said inner rim, and an endless band or tire resting on said resilient material and between said guide-surfaces, substantially as and for the purposes specified.

4. In a resilient tire for wheels, the combination with the wheel-rim, of a detachable inner rim, a resilient bed or support carried by said inner rim, and an endless band or tire resting on said bed between the edges of the wheel-rim and being of approximately square shape so as to be capable of being turned to present any one of its faces as the wearing-surface, substantially as described.

In testimony whereof I have hereunto set my hand this 16th day of December, 1897.

HENRY CONSTABLE.

Witnesses:
 H. ASHLEY NORRIS,
 A. B. CROFTS.